Oct. 28, 1958  M. G. RODRIGUEZ  2,857,797
LATHE DOG HAVING AN ADJUSTABLE TAIL
Filed May 24, 1957

INVENTOR.
MANUEL G. RODRIGUEZ,
BY
McMorrow, Berman + Davidson
ATTORNEYS.

United States Patent Office 2,857,797
Patented Oct. 28, 1958

2,857,797

LATHE DOG HAVING AN ADJUSTABLE TAIL

Manuel G. Rodriguez, New Britain, Conn.

Application May 24, 1957, Serial No. 661,343

1 Claim. (Cl. 82—41)

This invention relates to a lathe dog, and more particularly to a device of this nature having a tail adjustably fastened to the apertured body of the dog.

Conventionally, a lathe dog is formed with the body and tail thereof in one piece. This construction has certain disadvantages, which it is proposed to eliminate by the dog constituting the invention.

Among important objects of the invention are the following:

First, to permit distances to be varied between the dog and the chuck of the lathe or milling machine without necessity of removing the part to be machined;

Second, to permit angular adjustment of the tail relative to the plane of the body portion of the dog, from the usual position in which the tail extends at 90 degrees to said plane;

Third, to form the dog in such a manner as to facilitate and speed up off center milling, cutting, and other lathe work;

Fourth, to avoid forcing the center of the work where an off center operation is required;

Fifth, to provide greater safety for the operator as well as protection against damage to the work during operation of the machine; and Sixth, to save time and labor by permitting the device to be used with a standard chuck, as distinguished from conventional devices in which, when it is necessary to protect a part of the work already machined in a prior operation, a special chuck with a dog attachment must be used.

Summarized briefly, the invention comprises a dog including a body having a work-receiving opening and a set screw threadable radially inwardly of the opening against the work, the body being formed with a radial projection having a slot paralleling the axis of the body. The device further includes a tail, in the form of a straight, elongated member engageable in the slot by means of a set screw threadable inwardly of the slot. The member providing the tail is adjustable in the direction of its length, along a line paralleling the axis of its body and furthermore is adjustable radially outwardly of the work, that is, transversely of the tail. Still further, the tail is adjustable about an axis extending transversely thereof, said axis lying in the plane of the body and extending normally to the axis of the body.

Other objects will appear from the following description, the claim appended thereto, and from the annexed drawing, in which like reference characters designate like parts throughout the several views, and wherein:

Figures 1, 2:
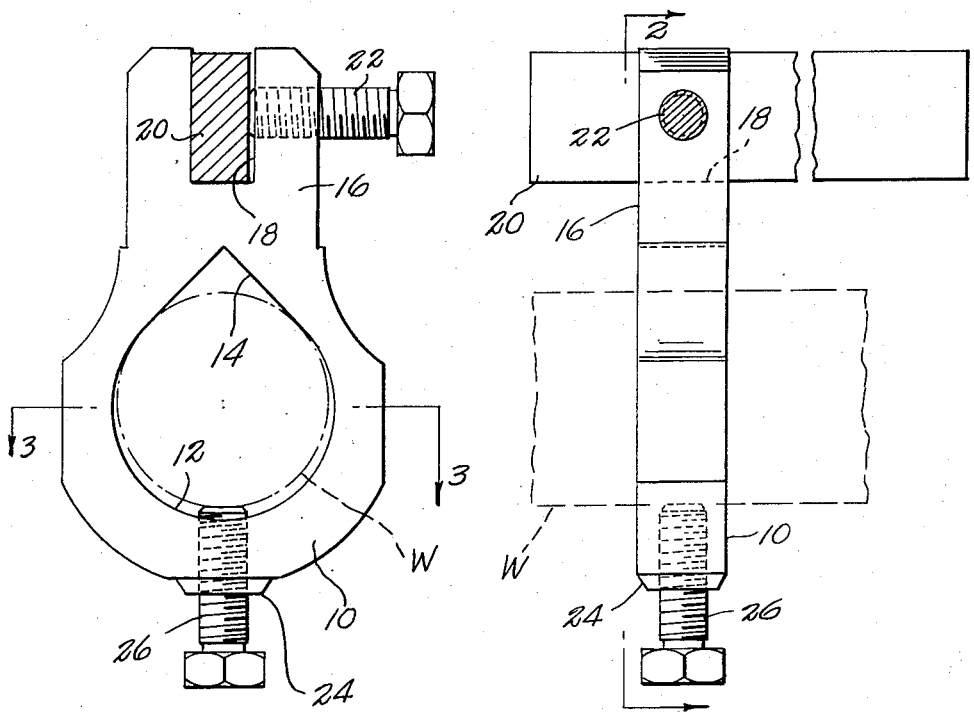
Figure 1 is a side elevational view of the lathe dog, a portion of the tail being broken away, the work being illustrated fragmentarily and in dotted lines.
Figure 2 is a sectional view substantially on line 2—2 of Figure 1.
Figure 3:
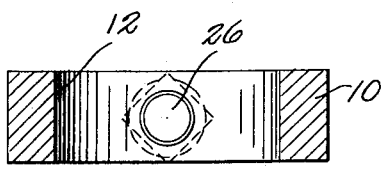
Figure 3 is a sectional view on line 3—3 of Figure 2.

The lathe dog constituting the invention includes a generally flat, angular body 10 having flat, opposed faces and formed with an opening 12 which is circular through the greatest part thereof, the opening being formed with a V-shaped extension 14 the walls of which are tangential to the circular part of the opening.

At the end of the body in which the V-shaped extension 14 is formed, the body is integral with a wide, flat, radially extending ear 16, and medially between the opposite sides of the ear a through recess 14 is formed, having a rectangular cross section, said recess opening upon the outer end of the ear. A tail 20 formed as a straight, elongated bar of rectangular cross section is removably engageable in the ear and is held in place by a set screw 22 threadable transversely through the ear into the slot 18.

At the end of the body diametrically opposite the ear, the body is formed with a boss 24 having a threaded opening extending into communication with the opening 12. A set screw 26 is engaged in the threaded opening of the boss, and is adapted to be bound against the work W, to securely engage the work in the opening of the body.

The construction has decided advantages over conventional lathe dogs. For example, in a conventional dog, the tail is integral with the lathe dog body. In the invention, however, the tail can be adjusted in the direction of its length, that is, to right or left in Figure 1. As a result, the end of the tail that engages the chuck, that is, the end shown at the right in Figure 1, may be positioned any of various selected distances from the body of the dog. This permits variations in said distances without necessity of removing the work that is to be machined.

Further, a standard lathe dog has the tail extending at 90 degrees to the plane of the body, that is, in the Figure 1 position of these components. In accordance with the invention, the tail can be swung to selected angular positions relative to the body at other than 90 degrees, and in this event will in effect be tilted within the slot about an axis extending transversely of the tail, as for example, the axis defined by the screw 22.

The device has desirable advantages in permitting a wide range of adjustment when a lathe dog is necessary to protect some part of the work, as for example threads already machined on the part or finished work. Further, the device can be used with a standard chuck, without requiring a special chuck having a dog attachment. This provides greater protection for the work as well as more safety for the operator, and facilitates various milling and cutting operations, such as off center milling.

The size of the device can of course be varied according to the desires of the manufacturer or lathe operator.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claim.

What is claimed is:

A lathe dog comprising a generally annular, flat body having a radially extending, threaded opening communicating between the inner and outer surfaces of the body; a clamping screw threadedly engaged in said opening for movement radially inwardly of the body against a work piece extending through the body for clampably engaging the work piece in the body, the body being formed with an integral, radial projection diametrically opposite said opening and clamping screw, said radial projection having a distal end formed with a slot, said slot opening upon opposite faces of the body and upon the distal end surface of the projection, the slot being formed with flat side walls in parallel planes perpendicular to the planes of opposite faces of the body, and with a bottom wall of flat formation disposed in a plane parallel to the axis of the body and perpendicular to the planes of the side walls, said projection having a threaded opening communicating between one side surface of the projection and said slot, the threaded opening of the projection opening into the slot through one of the side walls of the slot, substantially medially between the bottom wall of the slot and the distal end surface of the projection; and an elongated tail of a cross-sectional shape complementing that of the slot, said tail being slidably adjustable in the direction of its length within the slot in contact with the bottom surface and the other side wall of the slot, said tail being bodily adjustable in a direction transversely thereof away from the bottom wall, and being rockable about the axis of the second named opening within the slot; and a set screw threadedly engaged in the second named opening and bearing against the tail in selected positions to which the tail is adjusted, for binding the tail against movement relative to the projection in each of said selected positions of adjustment of the tail.

References Cited in the file of this patent

UNITED STATES PATENTS

| | | |
|---|---|---|
| 189,953 | Niebell | Apr. 24, 1877 |
| 214,885 | Claud | Apr. 29, 1879 |
| 1,812,180 | Taggart | June 30, 1931 |